Dec. 3, 1935.  J. M. REITER ET AL  2,023,099
MOTOR VEHICLE LICENSE PLATE
Filed Nov. 5, 1934
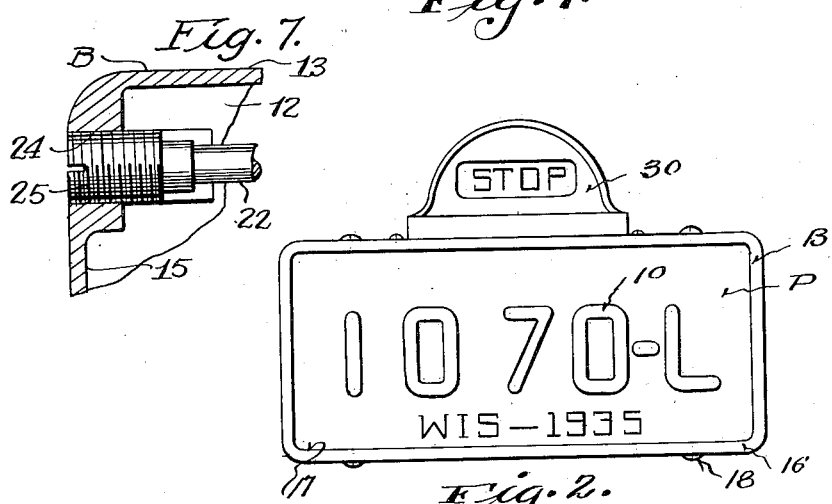
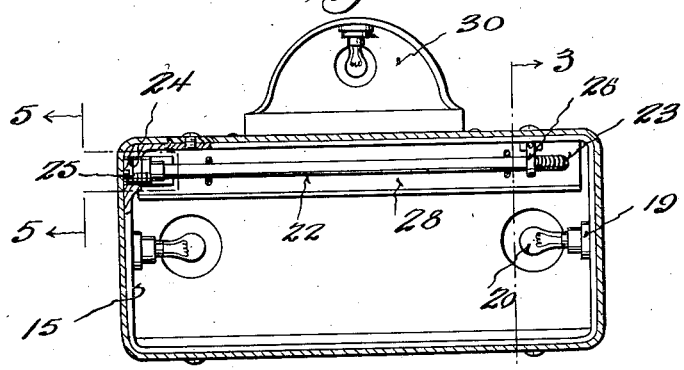
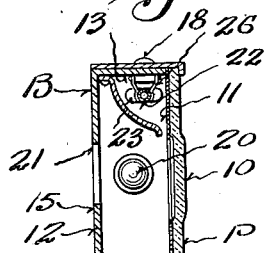
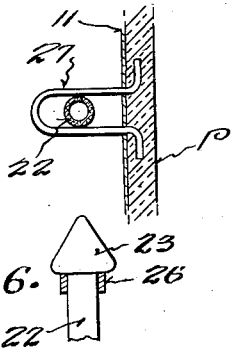
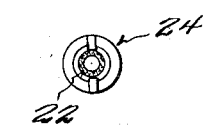
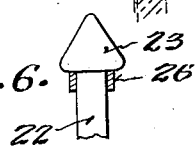

Patented Dec. 3, 1935

2,023,099

UNITED STATES PATENT OFFICE 2,023,099

MOTOR VEHICLE LICENSE PLATE

John M. Reiter and Chester R. Reiter, Green Bay, Wis.

Application November 5, 1934, Serial No. 751,574

5 Claims. (Cl. 40—132)

This invention appertains to motor vehicle license plates, and more specifically to novel means for preventing use of the plates other than on the particular vehicle for which the same were issued.

As is well known, it is the custom of criminals to provide their cars with two or more sets of plates, and to change these plates after the committing of an offense to prevent police from tracing the cars used in carrying out the crime. These plates are usually stolen from cars belonging to innocent persons, or are obtained in any other illegal manner.

Therefore, it is one of the salient objects of our invention to provide a novel license plate and a novel holder therefor which are so constructed and arranged that attempts of persons to remove the plates from the vehicle will result in mutilation of the plate to such an extent that further use thereof will be prevented, which will effectively eliminate the unauthorized use of license plates, and thus lessen the perpetration of the crime or the easy escape of the criminals after committing a crime.

Another important object of our invention is the provision of a license plate holder in the nature of an illuminated box, with a glass license plate forming the outer wall thereof, the plate having license indicia thereon and an opaque covering around the same, whereby the light from the box will emanate through the license indicia, means being provided for mutilating or washing off the opaque covering when attempt is made to remove the plate, whereby to prevent the reading of the license indicia on the plate.

A further object of our invention is to provide a frangible tube within the box containing a suitable liquid or acid, with means for breaking the tube when attempt is made to remove the license plate, whereby the acid will flow over the inner face of the plate and destroy the opaque covering on the plate, and thus prevent further reading of the license number.

A further object of our invention is to provide novel means for associating the frangible tube with the box, whereby any attempt to remove the tube from the box will result in the breaking of the tube and the consequent destroying of the license plate.

A still further object of our invention is to provide an anti-theft license plate of the above character, which will be efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:

Figure 1 is a front elevation of our novel license plate and holder.

Figure 2 is a similar view, with the outer license plate removed and the holding band in section, parts of the box being shown broken away and in section to illustrate structural details.

Figure 3 is a transverse sectional view through the device, taken on the line 3—3 of Figure 2, looking in the direction of the arrows.

Figure 4 is an enlarged detail section through the front plate and tube, illustrating the connection therebetween.

Figure 5 is a detail section through the tube illustrating the connection between the tube and its supporting plug.

Figure 6 is an enlarged, detail horizontal section, illustrating the means for supporting the inner end of the tube and for preventing the withdrawal of the tube.

Figure 7 is an enlarged detail vertical sectional view illustrating the means for supporting the outer end of the tube.

Referring to the drawing in detail, wherein similar reference characters designate corresponding parts throughout the several views, the letter P generally indicates the license plate, and B the supporting box therefor.

The license plate P is preferably formed from glass or other transparent material, and has formed thereon the desired license number 10. The license number 10 is of the same color as the body of the plate, and the plate has its rear face provided with an opaque coating 11 around the license number, so that the number can be easily read when the plate is illuminated. It is preferred to use letters in connection with the license number, so as to obviate the necessity of using license numbers of extremely high denomination.

The box B includes a rear wall 12 having formed thereon top and bottom walls 13 and 14, and side walls 15. The license plate P forms the outer wall of the box and can be held in place in any preferred manner. As shown, we have provided a removable frame 16 which surrounds the box, having a front flange 17 for engaging the outer face of the plate. This removable frame 16 can be slipped on the box from the front thereof and can be held in place in any preferred manner, such as by the use of screws 18. This frame 16 forms a guard for the glass plate against blows, and also performs another function which will be later set forth.

Inside the box are arranged suitable electric sockets 19 for the reception of incandescent lamps 20, so that the rays of light from the lamps will shine through the transparent license numbers. These sockets can be supported in any preferred manner or at any desired point in the box, and it is preferred to have the rear wall 12 provided with hand entrance openings 21, whereby the lamps can be conveniently removed when the same are burnt out. These openings can be covered by pivoted plates (not shown), if so desired.

Within the box B, adjacent to the top wall thereof, we dispose a frangible tube 22 preferably formed from light glass. This tube is sealed and filled with a desired kind of liquid or acid which has the qualities of quickly removing or mutilating paint from a surface.

The tube 22 extends longitudinally of the box, or casing, and has its forward or inner end provided with an arrow-shaped head 23. The tube is inserted within the casing through an opening 24 formed in one end wall 15 of the casing and is preferably carried by a closure plug 25 which is threaded in said opening. There can be a swivel connection between the tube and the plug 25, whereby to permit rotation of the plug independently of the tube.

Within the casing, or box, B, at a point spaced from the end wall 15 having the opening 24, are two resilient metallic fingers 26. These fingers can be supported from the casing in any preferred manner, such as from the top wall 13 thereof, and when the tube is inserted within the box, the arrow-shaped head spreads the fingers, and as the head rides past the fingers the same snap in rear of the head. Thus, the fingers form a support for the tube and prevent the withdrawal of the tube, and obviously when force is used to remove the tube the fingers will break the head, releasing the liquid contained within the tube.

The glass license plate P has embedded within the rear face thereof wire loops 27, and when the tube is placed within the box, the same is threaded through the loops, so that when attempt is made to remove the license plate, the loops will break the tube and thus release the liquid.

The removable frame 16 normally covers the plug 25 and thus hides the same from the view of observers and renders finding thereof difficult.

The box is firmly secured to the motor vehicle against removal at the desired points, and, if preferred, the box can be welded in place or formed directly within the body of the vehicle.

Directly below the tube 22 we provide a longitudinally extending trough 28. This trough 28 is arranged below the tube and can be suspended from the top wall 13 of the box B. The front edge of the trough is disposed in slightly spaced relation to the license plate P, and when the tube is broken, the liquid is caught by the trough and distributed as a thin film over the inner face of the plate. This film of liquid will function to mutilate or remove the opaque backing from the glass plate and thus prevent the reading of the license number.

From the foregoing description, it can be seen that we have provided an efficient and effective means for preventing the removal of license plates from automobiles without the destroying of the license numbers thereon, which will effectively prevent the use thereof by unauthorized persons.

Obviously, a system can be worked out by the police department for the proper distribution and handling of the license plates, and the license plates and the acid containing tubes are installed by persons in proper authority.

The destroying of any plate through accident or otherwise will have to be accounted for by the user of the vehicle before a new plate will be issued.

Our preferred form of construction contemplates inserting an extra covering under the front flange 17 to render it impossible to remove this cover as the tube passes through it.

This device may also be used on airplanes or other vehicles wherein a license plate may be required.

Changes in details may be made without departing from the spirit or the scope of this invention, but what we claim as new is:—

1. The combination with a license plate holder, of a license plate having a painted surface, and a frangible tube supported by the holder having a paint-removing liquid therein, and means for breaking the tube over the plate when attempt is made to remove the plate from the holder.

2. The combination with a license plate holder, of a license plate having a painted surface, a frangible tube containing a liquid paint remover, means for breaking the tube when attempt is made to remove the plate, and means directing the liquid in the tube over the painted surface of the plate.

3. The combination with a license plate holder, including a casing, of a license plate forming the outer wall of the casing having a painted surface, a frangible tube within the casing having a paint removing liquid therein, and means for breaking the tube over the painted surface of the plate when attempt is made to remove the plate.

4. The combination with a license plate holder, including a casing, of a license plate forming the outer wall of the casing having a painted surface, a frangible tube within the casing having a paint removing liquid therein, means for breaking the tube over the painted surface of the plate when attempt is made to remove the plate, and means for breaking the tube when attempt is made to remove the same from the casing.

5. The combination with a license plate holder, including a casing, of a transparent license plate forming the outer wall thereof, the license plate having transparent indicia thereon, an opaque backing for the plate surrounding the indicia, a frangible tube within the casing containing a liquid for destroying the backing, a trough within the casing for receiving the liquid from the tube upon the breaking thereof for directing the liquid over the backing, a connection between the plate and tube, whereby when attempt is made to remove the plate the tube will be broken, and means for preventing withdrawal of the tube from the casing without the breaking thereof.

JOHN M. REITER.
CHESTER R. REITER.